United States Patent
Kuo et al.

(10) Patent No.: US 7,936,856 B1
(45) Date of Patent: May 3, 2011

(54) TIMING SYNCHRONIZATION IN WIRELESS COMMUNICATION SYSTEM

(75) Inventors: Chun-Ming Kuo, Taipei County (TW); I-Ping Chang, Tainan (TW); Chi-Yeh Yu, Hsinchu (TW); Shih-Kung Chang, Chiayi (TW); Ho-Chi Huang, Hsinchu County (TW)

(73) Assignee: Mediatek Inc., Hsin-Chu (TW)

( * ) Notice: Subject to any disclaimer, the term of this patent is extended or adjusted under 35 U.S.C. 154(b) by 661 days.

(21) Appl. No.: 11/854,646

(22) Filed: Sep. 13, 2007

Related U.S. Application Data

(60) Provisional application No. 60/825,941, filed on Sep. 18, 2006.

(51) Int. Cl.
*H04L 7/00* (2006.01)
*H04L 27/06* (2006.01)

(52) U.S. Cl. ........................ 375/365; 375/343

(58) Field of Classification Search .......... 375/140–141, 375/145, 293, 354–355, 364–368, 373, 375–376, 375/147–150, 260, 316, 322, 324–327, 340, 375/343; 370/310, 103, 105, 319, 321, 324, 370/345, 350, 498, 503, 507, 509, 511–515, 370/105.4; 455/51.1, 502
See application file for complete search history.

(56) References Cited

U.S. PATENT DOCUMENTS

| 5,241,688 | A | * | 8/1993 | Arora | 455/502 |
| 7,062,282 | B2 | | 6/2006 | Liu et al. | |
| 7,130,331 | B2 | * | 10/2006 | Kang et al. | 375/149 |
| 2001/0022779 | A1 | * | 9/2001 | Wheatley et al. | 370/252 |

OTHER PUBLICATIONS

Gardner, W., The Role of Spectral Correlation in Design and Performance Analysis of Synchronizers, 1986, IEEE Transactions on Communications, vol. 34, Issue 11, pp. 1089-1095.*

* cited by examiner

*Primary Examiner* — Tesfaldet Bocure
*Assistant Examiner* — Lawrence B Williams
(74) *Attorney, Agent, or Firm* — Thomas|Kayden

(57) ABSTRACT

A synchronization circuit includes a correlator, an energy calculator, a post-processing unit, and a decision device. The correlator correlates a received sequence r(t) with a local sequence c(i) to obtain a correlation result h(t). The energy calculator calculates an energy function of the correlation result h(t), and filters the energy function of the correlation result by a channel impulse response $w_c(l)$ to obtain a filtered energy function e(t), where l is the index of the channel impulse response. The post-processing unit applies weighting function $w_a(t)$ to the filtered energy e(t) to obtain a weighted energy function e'(t), wherein the weighting function $w_a(t)$ weights a central portion of the filtered energy function e(t). The decision device selects a maximum energy value from the weighted energy function e'(t), and the time index t with maximum energy value is the time shift of the received sequence and the local sequence.

28 Claims, 10 Drawing Sheets

TIMING SYNCHRONIZATION IN WIRELESS COMMUNICATION SYSTEM

BACKGROUND OF THE INVENTION

1. Cross Reference

This application claims the benefit of U.S. provisional application Ser. No. 60/825,941 filed on Sep. 18, 2006, the subject matter of which is incorporated herein by reference.

2. Field of the Invention

The invention relates to time synchronization in wireless communication systems, and, more particularly, to techniques of time synchronization for low carrier-to-interference ratio signals.

FIG. 1 shows a wireless communications receiver. The receiver comprises a RF front end 102, a synchronization circuit 104, a channel estimator 106, an equalizer (EQ) 108, and an outer receiver 110. The RF front end 102 receives and processes radio frequency signals from a channel into baseband signals. Synchronization circuit 104 synchronizes the received packets by determining the frame and slot boundary of each packet. The synchronized data is sent to equalizers 108 and outer receiver 110 for further processing such as decoding, decompressing, and others. Synchronization circuit 104 is essential for any communications system employing coherent detection.

Typically, a transmitted signal includes additional signal data for synchronizing communication among receivers and transmitters. The additional signal data may comprise a preamble, training sequence, synchronization burst, synchronization byte, and others. The synchronization burst is known by the receiver in advance, the timing of the sequence when it is received is, however, unknown. In most communication systems, synchronization is accomplished by correlating a received sequence with a local sequence. A correlator computes a correlation result indicating how much the received sequence and the local sequence are related.

Correlation results are highly sensitive to carrier-to-interference ratio (C/I). For example, correlation results break down at a C/I ratio lower than −8 dB. Thus, a robust time synchronization scheme, capable of sustaining a poor C/I ratio, is desirable.

BRIEF SUMMARY OF THE INVENTION

Accordingly, synchronization circuits with improved performance are provided.

In one aspect of the invention, a synchronization circuit for determining the timing shift of a received sequence and a local sequence is disclosed, comprising a correlator, an energy calculator, a post-processing unit, and a decision device. The correlator correlates the received sequence with the local sequence to obtain a correlation result h(t). The energy calculator calculates an energy function e(t) of the correlation result h(t). The post-processing unit applies weighting function $w_a(t)$ on the filtered energy e(t) to obtain a weighted energy function e'(t), wherein the weighting function $w_a(t)$ heavily weights a central portion of the filtered energy e(t) in comparison to a side portion of the filtered energy function e(t). The decision device selects a maximum energy value from the weighted energy function e'(t), and the time index t with maximum energy value is the time shift of the received sequence and the local sequence.

In another aspect of the invention, a synchronization circuit for determining the timing shift of a received sequence and a local sequence is provided, comprising a correlator, an energy calculator, a post-processing unit, and a decision device. The a correlator correlating the received sequence with the local sequence c(i) to obtain a correlation result h(t). The energy calculator calculating an energy function of the correlation result h(t), and filtering the energy function of the correlation result by a channel impulse response $w_c(l)$ to obtain a filtered energy function e(t), where l is the index of the channel impulse response. The post-processing unit applying equal weighting on the filtered energy e(t) to obtain a weighted energy function e'(t). The decision device selecting a maximum energy value from the weighted energy function e'(t), and the time index t with maximum energy value is the time shift of the received sequence and the local sequence.

In yet another aspect of the invention, a method for determining the timing shift of a received sequence and a local sequence in a synchronization circuit is disclosed, comprising providing a correlator correlating the received sequence with the local sequence to obtain a correlation result h(t), providing an energy calculator calculating an energy function e(t) of the correlation result h(t), providing a post-processing unit applying weighting function $w_a(t)$ on the filtered energy e(t) to obtain a weighted energy function e'(t), wherein the weighting function $w_a(t)$ heavily weights a central portion of the filtered energy e(t) against a side portion of the filtered energy function e(t), and providing a decision device selecting a maximum energy value from the weighted energy function e'(t), and the time index t with maximum energy value is the time shift of the received sequence and the local sequence.

In still another aspect of the invention, a method for determining the timing shift of a received sequence and a local sequence in a synchronization circuit is disclosed, comprising providing a correlator correlating the received sequence with the local sequence c(i) to obtain a correlation result h(t), providing an energy calculator calculating an energy function of the correlation result h(t), and filtering the energy function of the correlation result by a channel impulse response $w_c(l)$ to obtain a filtered energy function e(t), where l is the index of the channel impulse response, providing a post-processing unit applying equal weighting on the filtered energy e(t) to obtain a weighted energy function e'(t), and providing a decision device selecting a maximum energy value from the filtered energy function e(t), and the time index t with maximum energy value is the time shift of the received sequence and the local sequence.

BRIEF DESCRIPTION OF THE DRAWINGS

The invention will become more fully understood from the detailed description, given herein below, and the accompanying drawings. The drawings and description are provided for purposes of illustration only, and, thus, are not intended to be limiting of the invention.

DETAILED DESCRIPTION OF THE INVENTION

Figure 1:
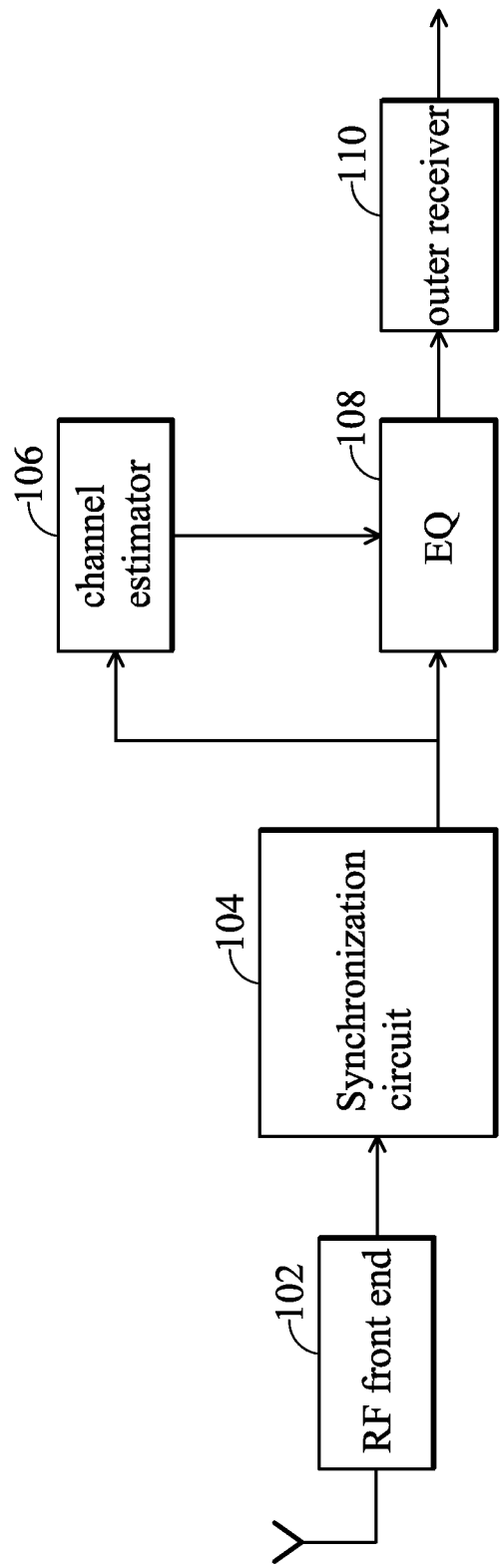
FIG. 1 shows a structure of a receiver for wireless communications.
Figure 2:
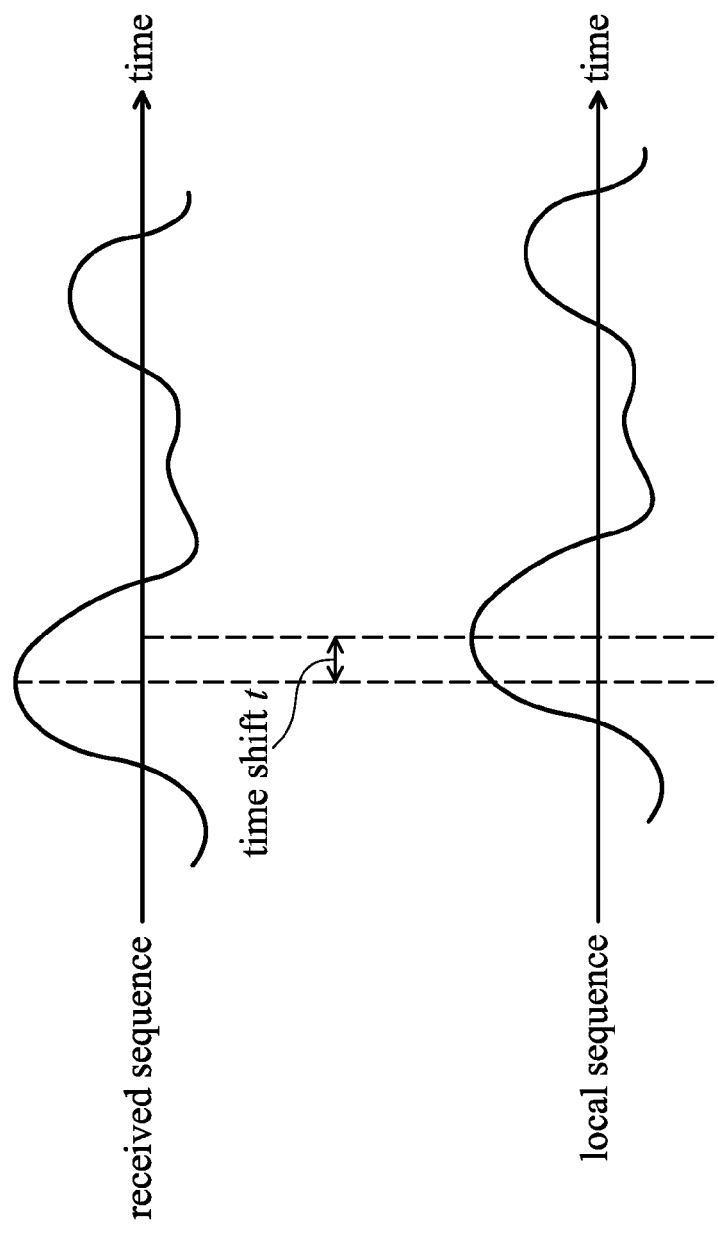
FIG. 2 shows the local sequence leading the received sequence by a timing shift t.

Conventional synchronization is accomplished by calculating the probability of the timing shift of the received sequence and the local sequence. The timing shift having a maximum probability is the most likely timing shift of the received sequence and the local sequence. The local sequence is re-aligned according to the timing shift to keep the timing shift to zero. FIG. 2 shows the local sequence leads the received sequence by a timing shift t. In FIG. 2, the local sequence must be delayed by a time unit t to synchronize the received sequence and the local sequence. The process of determining the most likely timing shift can be expressed by the following formula:

$$t = \arg \max_{t \in T} P(t | r), \tag{1}$$

where r is the received sequence, and T is the range of timing search.

According to maximum a-posteriori (MAP) algorithm, the most possible timing shift t can be also expressed as the following formula:

$$t = \arg \max_{t \in T} P(r | t) P(t), \tag{2}$$

If the probability of a certain timing shift is known, the synchronization process can be transformed to determining a-posteriori probabilities of the received sequence.

Figure 3:
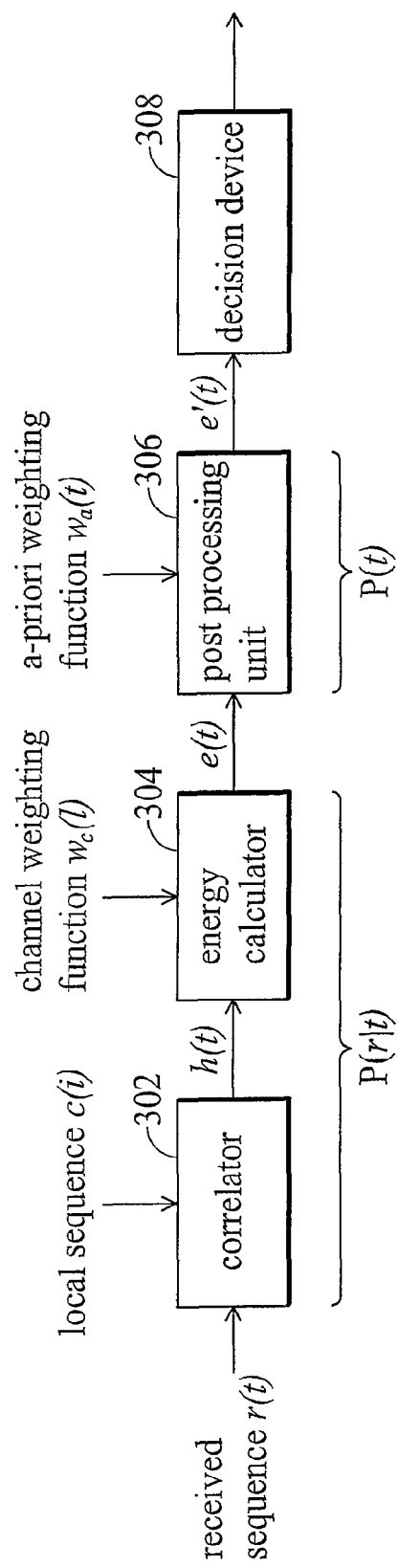
FIG. 3 shows a block diagram of an exemplary synchronization circuit in accordance with the MAP algorithm.
Figure 4:
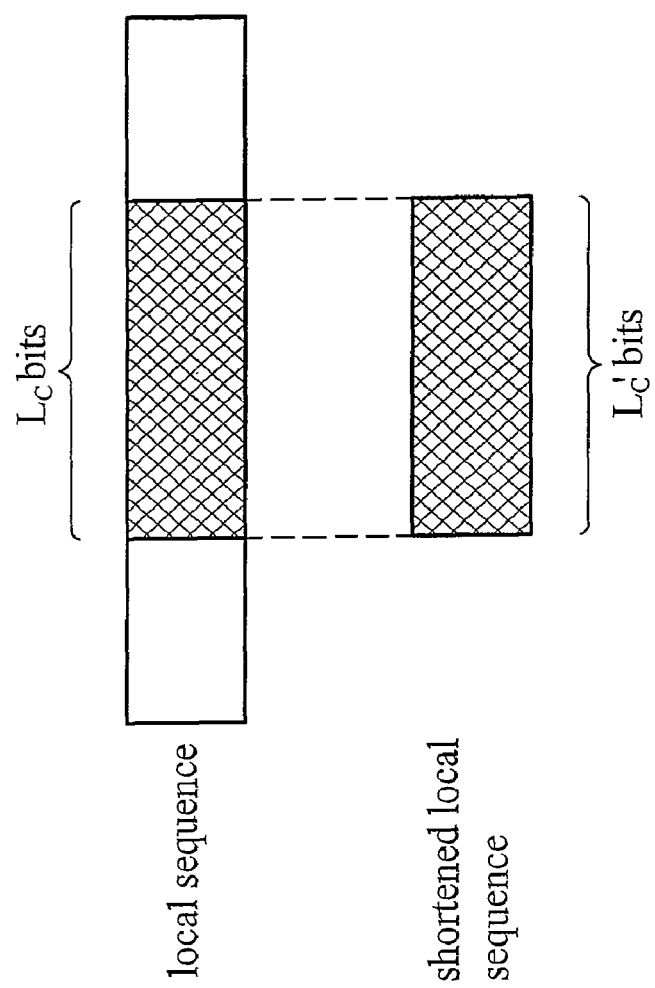
FIG. 4 shows a local sequence with $L_c$ bits and a shortened local sequence with $L_c'$ bits.

FIG. 3 shows block diagram of an exemplary synchronization circuit in accordance with the MAP algorithm. The synchronization circuit comprises a correlator 302, an energy calculator 304, a post-processing unit 306, and a decision device 308. The post-processing unit 306 provides a prior probability P(t), while a-posteriori probabilities are generated by the correlator 302 and the energy calculator 304. The correlator 302 correlates a received sequence with a local sequence. The correlation result h(t) is generated by following formula:

$$h(t) = \sum_{i=0}^{L_c} c(i) \cdot r(t+i), \tag{3}$$

where c(i) is the local sequence, and i is the index of the local sequence. The received sequence r(t) is a local sequence corrupted not only by timing uncertainty, but also by intersymbol interference (ISI) and channel noise. The tap length of the local sequence, $L_c$, is variable, i.e., the correlator 302 may correlate the received sequence with a local sequence, or with a shortened local sequence, where the shortened local sequence may be the central portion of the entire local sequence. For example, FIG. 4 shows a local sequence with $L_c$ bits and a shortened local sequence with $L_c'$ bits, wherein the shortened local sequence comprises the central portion of the entire local sequence. The energy of the correlation result h(t) is then calculated by the energy calculator 304. The energy calculator 304 filters the correlation result h(t) by a channel impulse response $w_c(l)$, where l is the index of the channel impulse response. In one aspect of the invention, the energy calculator 304 performs the following calculation:

$$e(t) = \sum_{l=0}^{L_e} w_c(l) \cdot |h(t+l)|^2. \tag{4}$$

Figure 5:
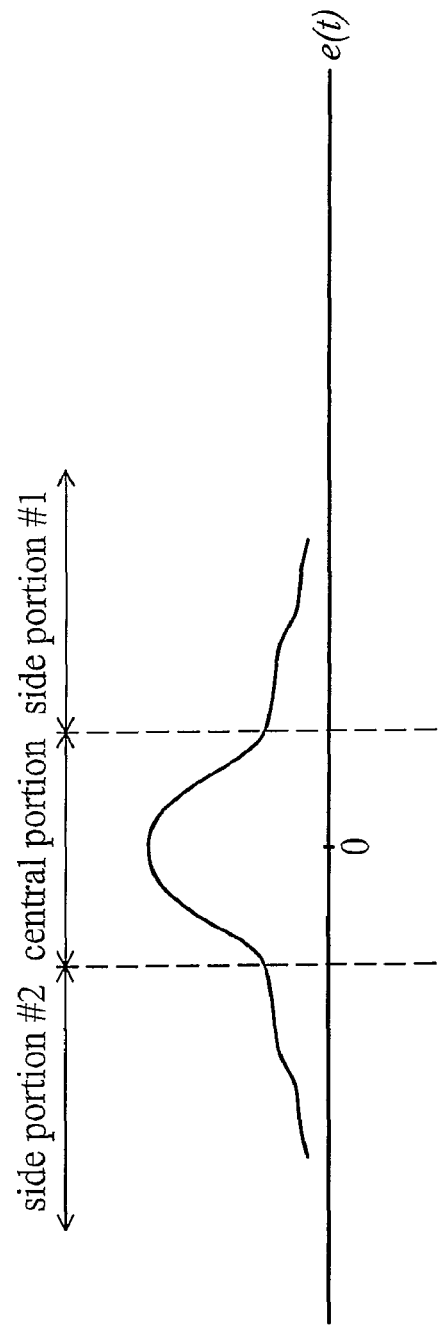
FIG. 5 shows the energy e(t) parted by a central portion and a side portion.

Because the received sequence is corrupted by intersymbol interference in the channel, formula (4) attempts to mitigate the effects of the imperfect channel. The post-processing unit 306 weights the filtered energy e(t). The weighting function $w_a(t)$ is generated by assuming the distribution of the filtered energy function e(t) is zero-mean Gaussian-like, i.e., the energy value of the filtered energy function e(t) near zero has a higher probability than the energy value far from zero. For example, the central portion of the energy e(t) is weighted by an integer of not less than one, and the side portion of the energy e(t) is weighted by a fraction of no greater than one. FIG. 5 shows the energy e(t) divided into one central portion and two side portions, and each portion is weighted by a factor. The decision device 308 selects a maximum energy value, and the time index t with maximum energy value is the time shift of the received sequence and the local sequence. The time index t is the measurement of the amount of correlation between the received sequence and the local sequence.

While the embodiment in FIG. 3 utilizes both the energy calculator 304 for filtering the correlation result h(t) by channel weighting function $w_c(l)$ and the post-processing unit 306 for applying a priori weighting function $w_a(t)$ on the filtered result of the energy calculator 304, it should be recognized that the synchronization circuit in FIG. 3 can determine the timing shift by only one weighting function thereof, those skilled in the art can make modification to the synchronization circuit where appropriate to meet the design requirement.

Figure 6:
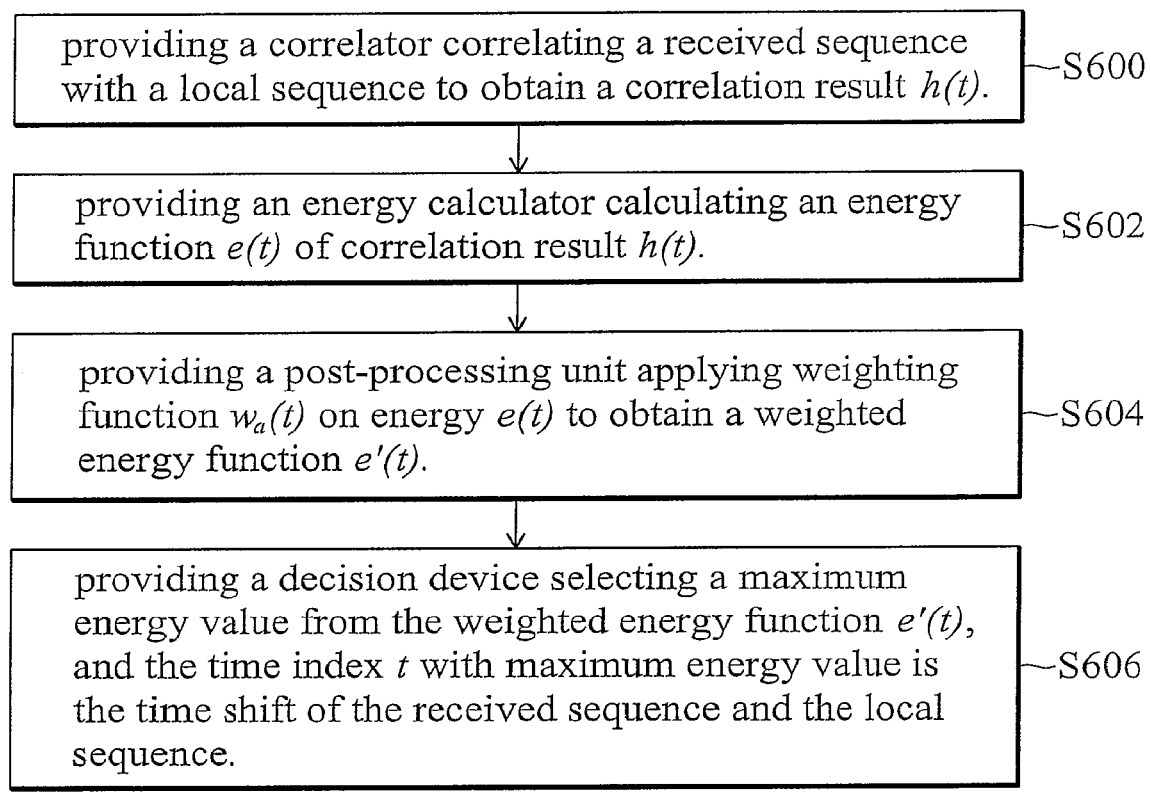
FIG. 6 is a flowchart of an exemplary method for determining the timing shift of a received sequence and a local sequence.
Figure 8:
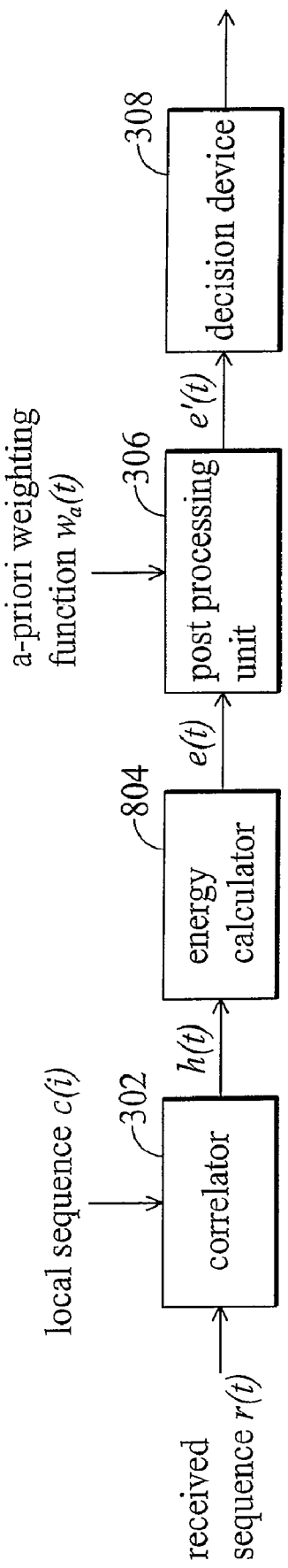
FIG. 8 is a block diagram of another exemplary synchronization circuit according to the invention.

FIG. 6 is a flowchart of an exemplary method for determining the timing shift of a received sequence and a local sequence, incorporating the synchronization circuit in FIG. 8. The synchronization circuit in FIG. 8 comprises the correlator 302, post-processing unit 306, and decision unit 308 identical to those in FIG. 3. The energy calculator 804 calculates energy function e(t) of the input without applying channel impulse response $w_c(l)$ in Equation (4).

In step S600, the correlator 302 is provided for correlating the received sequence r(t) with the local sequence c(i) to obtain the correlation result h(t) by Equation (3). Tap length $L_c$ of local sequence c(i) is adaptable by the correlator 302, where the shortened local sequence c(i) may be the central portion of the entire local sequence c(i). The local sequence c(i) may be substantially the same as the received sequence r(t).

In step S602, the energy calculator 804 is provided for calculating an energy function e(t) of correlation result h(t).

Next in step S604, the post-processing unit 306 is provided for applying weighting function $w_a(t)$ on energy e(t) to obtain a weighted energy function e'(t). The weighting function $w_a(t)$ heavily weights a central portion of the filtered energy e(t) in comparison to a side portion of the filtered energy function e(t).

In step S606, the decision device 308 is provided for selecting a maximum energy value from the weighted energy function e'(t), and the time index t with maximum energy value is the time shift of received sequence r(t) and local sequence c(i).

Figure 7:
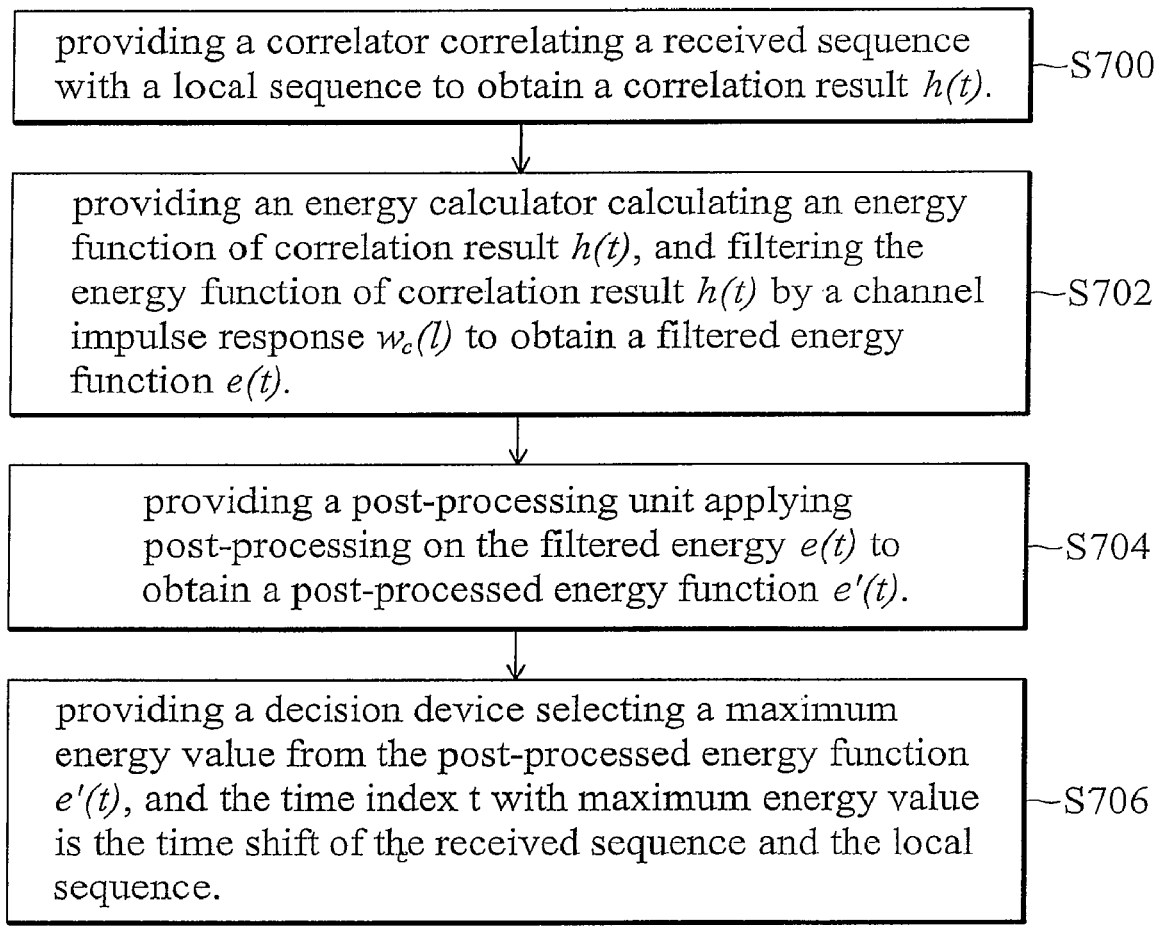
FIG. 7 is a flowchart of another exemplary method for determining the timing shift of a received sequence and a local sequence.
Figure 9:
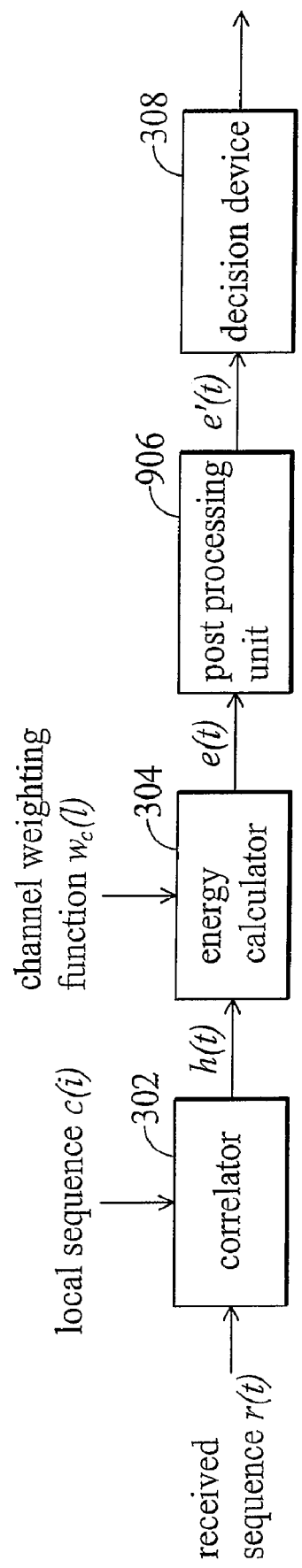
FIG. 9 is a block diagram of yet another exemplary synchronization circuit according to the invention.

FIG. 7 is a flowchart of another exemplary method for determining the timing shift of a received sequence and a local sequence, incorporating the synchronization circuit in FIG. 9. The synchronization circuit in FIG. 9 comprises the correlator 302, energy calculator 304, and decision unit 308 identical to those in FIG. 3. The post-processing unit 906 post-processes the filtered energy e(t) to obtain a post-processed energy function e'(t).

In step S700, the correlator 302 is provided to correlate the received sequence r(t) with the local sequence c(i) to obtain the correlation result h(t) by Equation (3).

Next In step S702, the energy calculator 304 is provided for calculating an energy function of the correlation result h(t), and filtering the energy function of correlation result h(t) by the channel impulse response wc(l) to obtain a filtered energy function e(t).

In step S704, the post-processing unit 906 is provided for post-processing the filtered energy e(t) to obtain a post-processed energy function e'(t).

Then in step S706, the decision device 308 is provided for selecting a maximum energy value from the weighted energy function e'(t), and the time index t with maximum energy value is the time shift of received sequence r(t) and local sequence c(i).

While the exemplary methods in FIGS. 6 and 7 respectively apply one of channel weighting function $w_c(l)$ and priori weighting function $w_a(t)$ for calculating and processing, it should be recognized by those skilled in the art that a combination of the methods is also feasible for determining the timing shift, appropriate modification to the combinational method can be made to meet the design requirement.

Figure 10:
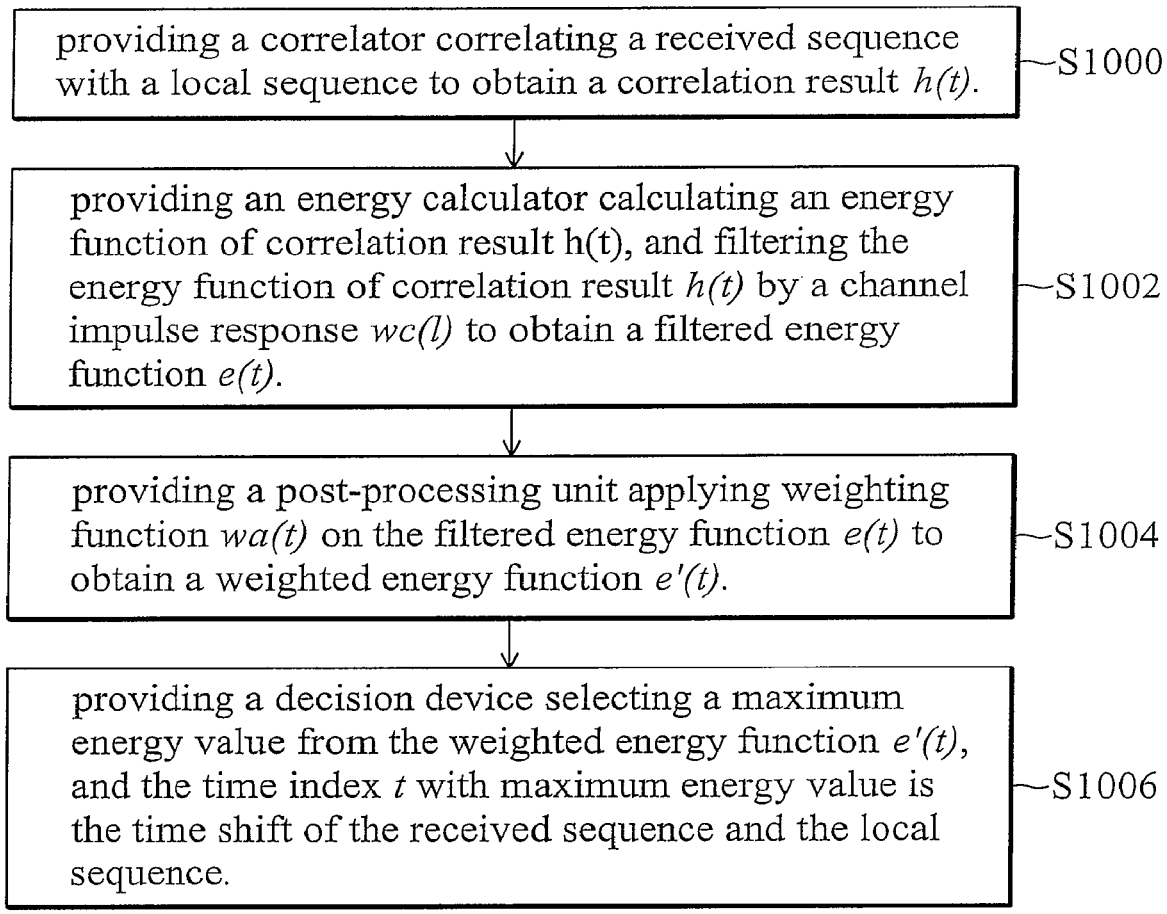
FIG. 10 is a flowchart of yet another exemplary method for determining the timing shift of a received sequence and a local sequence.

FIG. 10 is a flowchart of yet another exemplary method for determining the timing shift of a received sequence and a local sequence, incorporating the synchronization circuit in FIG. 3.

In step S1000, the correlator 302 is provided to correlate the received sequence r(t) with the local sequence c(i) to obtain the correlation result h(t) by Equation (3).

Next in step S1002, the energy calculator 304 is provided for calculating an energy function of the correlation result h(t), and filtering the energy function of correlation result h(t) by the channel impulse response $w_c(l)$ according to Equation (4) to obtain a filtered energy function e(t).

Then in step S1004, the post-processing unit 306 is provided for applying weighting function $w_a(t)$ on energy e(t) to obtain a weighted energy function e'(t). The weighting function $w_a(t)$ heavily weights a central portion of the filtered energy e(t) in comparison a side portion of the filtered energy function e(t). For example, the weighting function $w_a(t)$ may assign a heavier weighting on the central portion than the side portions of the filtered energy function e(t).

Finally in step S1006, the decision device 308 is provided for selecting a maximum energy value from the weighted energy function e'(t), and the time index t with maximum energy value is the time shift of received sequence r(t) and local sequence c(i).

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A synchronization circuit for determining the timing shift of a received sequence and a local sequence, comprising:
a correlator correlating the received sequence with the local sequence c(i) to obtain a correlation result h(t);
an energy calculator calculating an energy function e(t) according to the correlation result h(t);
a post-processing unit applying a weighting function $w_a(t)$ on the energy function e(t) to obtain a weighted energy function e'(t), wherein the weighting function $w_a(t)$ heavily weights a central portion of the energy function e(t) in comparison to a side portion of the energy function e(t); and
a decision device selecting a maximum energy value from the weighted energy function e'(t), and the time index t with maximum energy value is the time shift of the received sequence and the local sequence c(i).

2. The synchronization circuit as claimed in claim 1, wherein the local sequence c(i) has an adjustable tap length $L_c$.

3. The synchronization circuit as claimed in claim 1, wherein the energy calculator further filters the correlation result h(t) by a channel impulse response $w_c(l)$ before the post-processing unit applied a weighting function $W_a(t)$ on the energy function e(t), and l is the index of the channel impulse response.

4. The synchronization circuit as claimed in claim 1, wherein the correlation result h(t) is generated by the formula:

$$h(t) = \sum_{i=0}^{L_c} C(i) \cdot r(t+i),$$

wherein r(t) is the received sequence, c(i) is the local sequence, a tap length $L_c$ of the local sequence c(i) is adjustable, i is the index of the local sequence c(i).

5. The synchronization circuit as claimed in claim 1, wherein the local sequence c(i) is substantially the same as the received sequence.

6. The synchronization circuit as claimed in claim 1, wherein the local sequence c(i) is the central portion of the received sequence.

7. The synchronization circuit as claimed in claim 1, wherein the energy function e(t) is divided into one central portion and two side portions, the central portion of the energy function e(t) is weighted by an integer of not less than one, and the side portions of the energy function e(t) are weighted by a fraction no greater than one.

8. A synchronization circuit for determining the timing shift of a received sequence and a local sequence c(i), comprising:
a correlator correlating the received sequence with the local sequence c(i) to obtain a correlation result h(t);
an energy calculator calculating an energy function of the correlation result h(t), and filtering the energy function of the correlation result by a channel impulse response $w_c(l)$ to obtain a filtered energy function e(t), where l is the index of the channel impulse response;
a post-processing unit processing the filtered energy function e(t) to obtain a post-processed energy function e'(t); and
a decision device selecting a maximum energy value from the post-processed energy function e'(t), and the time index t with maximum energy value is the time shift of the received sequence and the local sequence c(i).

9. The synchronization circuit as claimed in claim 8, wherein the local sequence c(i) has an adjustable tap length $L_c$.

10. The synchronization circuit as claimed in claim 8, wherein the post-processing unit further applies a weighting function $w_a(t)$ on the filtered energy function e(t) to obtain the post-processed energy function e'(t), wherein the weighting function $w_a(t)$ heavily weights a central portion of the filtered energy function e(t) in comparison to a side portion of the filtered energy function e(t), and wherein the decision device selects the maximum energy value from the post-processed energy function e'(t).

11. The synchronization circuit as claimed in claim 8, wherein the correlation result h(t) is generated by the formula:

$$h(t) = \sum_{i=0}^{L_c} c(i) \cdot r(t+i),$$

wherein r(t) is the received sequence, c(i) is the local sequence, a tap length $L_c$ of the local sequence c(i) is adjustable, i is the index of the local sequence c(i).

12. The synchronization circuit as claimed in claim 8, wherein the local sequence c(i) is substantially the same as the received sequence.

13. The synchronization circuit as claimed in claim 8, wherein the local sequence c(i) is the central portion of the received sequence.

14. The synchronization circuit as claimed in claim 8, wherein the filtered energy function e(t) is obtained by the following calculation:

$$e(t) = \sum_{l=0}^{L_e} w_c(l) \cdot |h(t+l)|^2,$$

wherein $L_e$ is the tap length of the channel impulse response.

15. A method for determining the timing shift of a received sequence and a local sequence c(i) in a synchronization circuit, comprising:

providing a correlator correlating the received sequence with the local sequence c(i) to obtain a correlation result h(t);

providing an energy calculator calculating an energy function e(t) according to the correlation result h(t);

providing a post-processing unit applying a weighting function $w_a(t)$ on the energy function e(t) to obtain a weighted energy function e'(t), wherein the weighting function $w_a(t)$ heavily weights a central portion of the energy function e(t) against a side portion of the energy function e(t); and providing a decision device selecting a maximum energy value from the weighted energy function e'(t), and the time index t with maximum energy value is the time shift of the received sequence and the local sequence c(i).

16. The method as claimed in claim 15, wherein the local sequence c(i) has an adjustable tap length $L_c$.

17. The method as claimed in claim 15, further comprising the energy calculator filtering the correlation result by a channel impulse response $w_c(l)$, and l is the index of the channel impulse response.

18. The method as claimed in claim 15, wherein the correlation result h(t) is generated by the formula:

$$h(t) = \sum_{i=0}^{L_c} c(i) \cdot r(t+i),$$

wherein r(t) is the received sequence, c(i) is the local sequence, a tap length $L_c$ of the local sequence c(i) is adjustable, i is the index of the local sequence c(i).

19. The method as claimed in claim 15, wherein the local sequence c(i) is substantially the same as the received sequence.

20. The method as claimed in claim 15, wherein the local sequence c(i) is the central portion of the received sequence.

21. The method as claimed in claim 15, wherein the energy function e(t) is divided into one central portion and two side portions, the central portion of the energy function e(t) is weighted by an integer of not less than one, and the side portions of the energy function e(t) are weighted by a fraction no greater than one.

22. A method for determining the timing shift of a received sequence and a local sequence c(i) in a synchronization circuit, comprising:

providing a correlator correlating the received sequence with the local sequence c(i) to obtain a correlation result h(t);

providing an energy calculator calculating an energy function of the correlation result h(t), and filtering the energy function of the correlation result by a channel impulse response $w_c(l)$ to obtain a filtered energy function e(t), where l is the index of the channel impulse response;

providing a post-processing unit processing the filtered energy function e(t) to obtain a post-processed energy function e'(t); and providing a decision device selecting a maximum energy value from the post-processed energy function e'(t), and the time index t with maximum energy value is the time shift of the received sequence and the local sequence c(i).

23. The method as claimed in claim 22, wherein the local sequence c(i) has an adjustable tap length $L_c$.

24. The method as claimed in claim 22, wherein a weighting function $w_a(t)$ heavily weights a central portion of the filtered energy function e(t) in comparison to a side portion of the filtered energy function e(t), and wherein the provision of the decision device step comprises the decision device selects the maximum energy value from the post-processed energy function e'(t).

25. The method as claimed in claim 22, wherein the correlation result h(t) is generated by the formula:

$$h(t) = \sum_{i=0}^{L_c} c(i) \cdot r(t+i),$$

wherein r(t) is the received sequence, c(i) is the local sequence, a tap length $L_c$ of the local sequence c(i) is adjustable, i is the index of the local sequence c(i).

26. The method as claimed in claim 22, wherein the local sequence c(i) is substantially the same as the received sequence.

27. The method as claimed in claim 22, wherein the local sequence c(i) is the central portion of the received sequence.

28. The method as claimed in claim 22, wherein the filtered energy function e(t) is obtained by the following calculation:

$$e(t) = \sum_{l=0}^{L_e} w_c(l) \cdot |h(t+l)|^2,$$

wherein $L_e$ is the tap length of the channel impulse response.

* * * * *